United States Patent [19]

Handbury et al.

[11] 4,445,654
[45] May 1, 1984

[54] AIRCRAFT RECOVERY CHUTE

[76] Inventors: James W. Handbury; Dana Handbury, both of 44 East Hays St., Banning, Calif. 92220

[21] Appl. No.: 390,513

[22] Filed: Jun. 21, 1982

[51] Int. Cl.³ .............................................. B64D 17/80
[52] U.S. Cl. .................................... 244/139; 244/147; 244/DIG. 1; 244/141
[58] Field of Search .................... 244/138 R, 139, 140, 244/141, 142, 147, 148, 149, 152, DIG. 1, 16, 13, 110 D

[56] References Cited

U.S. PATENT DOCUMENTS

| 2,130,569 | 9/1938 | Smith | 244/148 |
| 3,429,531 | 2/1969 | Sepp | 244/147 |
| 3,622,109 | 11/1971 | Drew | 244/147 |
| 4,272,039 | 6/1981 | Hollingsworth | 244/DIG. 1 |
| 4,372,506 | 2/1983 | Crank et al. | 244/DIG. 1 |

FOREIGN PATENT DOCUMENTS

| 2726453 | 7/1978 | Fed. Rep. of Germany | 244/DIG. 1 |
| 445380 | 11/1912 | France | 244/139 |
| 468101 | 6/1914 | France | 244/139 |

Primary Examiner—Galen L. Barefoot
Attorney, Agent, or Firm—Brown & Martin

[57] ABSTRACT

An ultralight aircraft and/or pilot recovery system includes a parachute having a canopy connected by means of a plurality of shroud lines to a first elongated cable having a length to position the parachute clear of the aircraft engine and propeller with a second cable for connecting the parachute to the frame of the aircraft and including a harness worn by the pilot which includes a pouch for containing the canopy folded within an inner pouch to permit the pilot to grasp and toss the chute clear of the aircraft for deployment for recovery of the aircraft. An alternate embodiment provides for connecting the parachute to the harness worn by the pilot and securing the harness to the aircraft to thereby give the pilot the option to recover the aircraft or cut loose from the aircraft for pilot recovery only.

13 Claims, 5 Drawing Figures

AIRCRAFT RECOVERY CHUTE

BACKGROUND OF THE INVENTION

The present invention relates generally to safety devices for aircraft and aircraft personnel and more specifically to an aircraft recovery system for ultralight aircraft.

The sport of hang-gliding has considerably increased in popularity in recent years. Many of the modification of hang-gliders in recent years have included the application of small engines to such hang-gliders resulting in powered ultralight aircraft. While such aircraft and hang-gliders are relatively safe due to their low air speed and light weight which permit landing in a minimum of space certain hazards, such as structural failure, mid-air collisions, and loss of control, do exist.

It is known to provide with a parachute to enable a pilot to recover from such aircraft mishaps. It is desirable however, to provide where feasible, parachute capable of recovering the pilot and the aircraft. In addition, it is desirable that systems be available which enable the pilot to selectively recover the aircraft or eject therefrom.

While parachutes have been applied to aircraft for the purpose of attitude recovery and for the purpose of air braking, no use for the recovery of the aircraft as set forth herein is presently known. Examples of the prior art approach to attitude recovery are shown, for example, in U.S. Pat. No. 4,247,060 issued Jan. 27, 1981 to Cory. An example of the use of a parachute for aircraft air braking is shown for example in U.S. Pat. No. 2,631,797 issued to Smith, Mar. 17, 1958.

SUMMARY AND OBJECTS OF THE INVENTION

It is the primary object of the present invention to provide an improved recovery system for pilot and/or aircraft.

In accordance with the primary aspect of the present invention, a parachute for recovery of an ultralight aircraft includes a pilot's harness which includes a pouch for containing the canopy in a folded condition with cables for connecting the shroud lines of the canopy to the aircraft to permit the canopy to clear the structure of the aircraft. An alternate embodiment includes shackles for connecting the harness to the aircraft in a detachable manner and connecting the canopy to the harness to permit the pilot the option of cutting away the aircraft for pilot recovery only.

BRIEF DESCRIPTION OF THE DRAWINGS

The above and other objects and other advantages of the present invention will become apparent from the following description when read in conjunction with the drawings wherein.

DETAILED DESCRIPTION OF A PREFERRED EMBODIMENT

Figure 1:
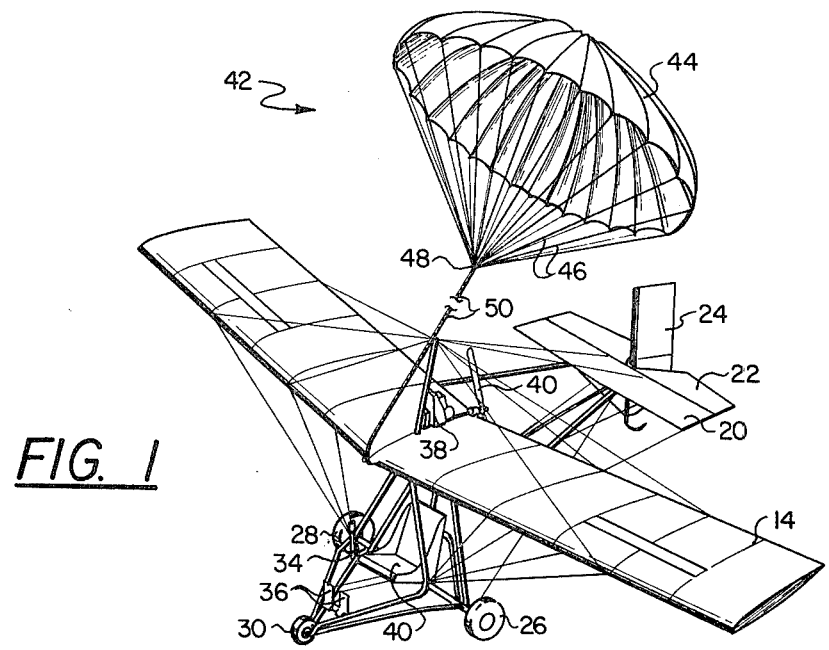
FIG. 1 is a perspective view showing an ultralight aircraft equipped with a system that is deployed in accordance with the invention.

Turning to the drawings, a typical ultralight aircraft is illustrated showing a pilot in a seated position in the aircraft with the recovery chute system deployed. The aircraft illustrated is of an ultralight-type, typically having a gross weight of less than 600 pounds and is of an open-frame high-winged configuration. The aircraft designated generally by the numeral 10 includes right and left wings 12 and 14 secured to a base or root tube 16 at the center of the aircraft and from which the other structure of the aircraft is also connected. A boom structure 18 extends from the wings backward to and supports a horizontal stabilizer 20 to which is hinged elevators 22 and a rudder 24. A tubular frame of a plurality of lightweight tubular structural members are secured to and extend downward from the root tube 16 for supporting the landing gear including a pair of main wheels 26 and 28 and nose wheel 30. A pilot's cockpit includes a seat 32 in which the pilot sits with control means including a stick 34 and control pedals 36. An aircooled engine 38 is mounted on a central structure portion of root tube 16 and drives a pusher prop 40 for propelling the aircraft.

Figure 2:
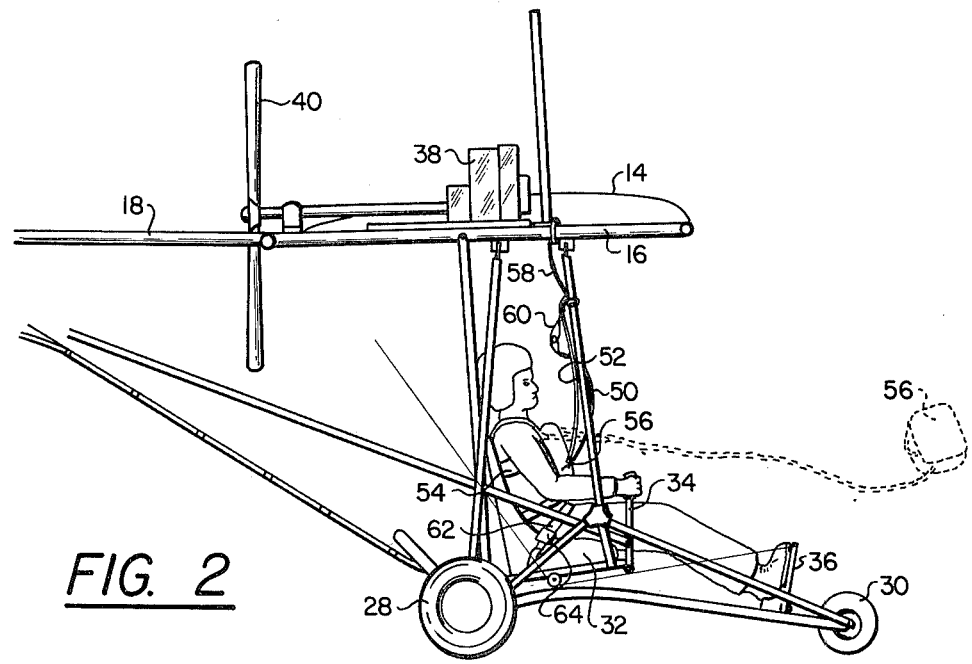
FIG. 2 is a side elevation view showing the pilot and details of the harness of the aircraft.

A parachute designated generally by the numeral 42 includes a canopy 44 of a selected canopy material such as nylon or the like, having a plurality of shroud lines 46 connected thereto in a conventional manner and which are connected at 48 to a bridle consisting of 7/32 inch plastic (e.g. vinyl) coated stainless steel cable 50. The canopy is preferably 28 foot, made of ripstop nylon coated to 0-3 CFM porosity, and produces about a 1000 foot-per-minute sink rate with both pilot and aircraft suspended. The cable 50 is connected by certain rigging as shown in FIG. 2 including a second vinyl coated stainless steel cable 52 which is connected to a harness 54 which the pilot wears or straps himself into. The harness is of substantially standard construction but with the chute container or bag secured to the front.

As shown in FIG. 2, the canopy of the parachute has been packed and is stored in a pack or bag 56 connected or secured to the front of the harness 54 and positioned on the pilot's chest. A cable 58, which may be termed an umbilical cord or choke cable, is secured at one end, such as looping over root tube 16 to the aircraft and is detachably connected at the other end by a cable clamp 60 to the juncture of the cable combination 50, 52. With this arrangement, the parachute is connected by cables both to the pilot's harness and to the aircraft. In the first illustrated embodiment, the cable 58 is preferably selected to have a length that permits the weight of the aircraft to be first carried by the parachute without pulling the cable 52 connected to the pilot's harness to its tensioned position (see FIG. 4).

The pilot is strapped to the aircraft such as by means of a seat belt 62 with one or more releasable buckles 64. With this arrangement, the pilot has the option of coming down with the aircraft or abandoning the aircraft and coming down with the chute alone. Such an arrangement gives the pilot the option of abandoning the aircraft should such conditions, such as fire, exist on the aircraft. However, in order to exercise the option, the pilot must detach the parachute cables 50 and 52 from the umbilical cable 58 by opening clamp 60 prior to deploying the chute. Once the chute is deployed in this configuration, the pilot must ride down with the aircraft.

Figure 3:
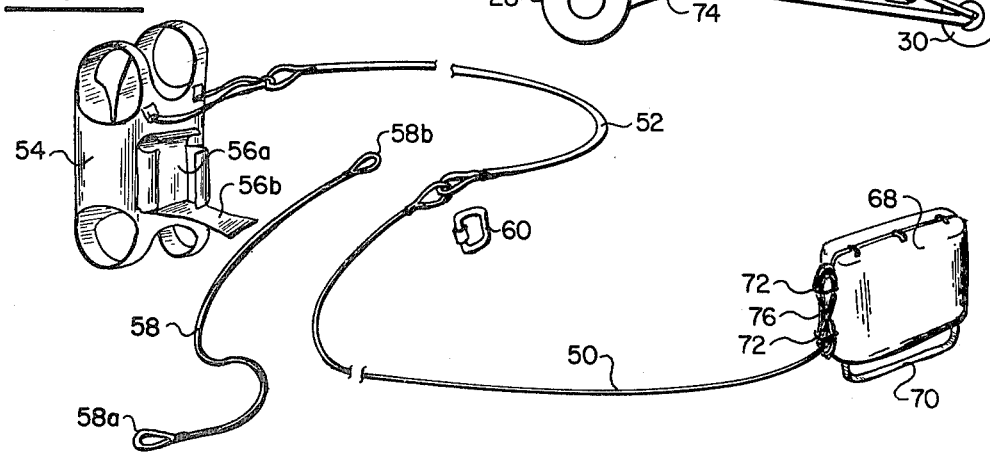
FIG. 3 is a detailed view showing details of the parachute pack.

Turning to FIG. 3, the chute assembly is illustrated in which an important feature of the invention is a deployment bag 68 in which the parachute is packed before placing it in the chest pack 56. The chest pack 56 is a panel of lightweight fabric material having a series of portions 56a and flaps 56b that are closed by a hook and loop type fastening means into an enclosable bag. When the pilot desires to deploy the chute he simply opens the chest pack by grasping the handle of the deployment or toss bag, pulling up and out to the side, and tosses it forward, clear of the aircraft as shown in phantom in FIG. 2. The weight of the parachute and rigging pulls it from the deployment bag as it reaches the end of the cable. The parachute is then caught by the passing air, inflates and is pulled to its open position.

Turning specifically to FIG. 3, the parachute assembly and rigging is shown in its packed form with the parachute packed within the toss bag 68. The deployment bag 68 is of a lightweight nylon or like material forming a generally rectangular bag that fits easily within the pack 56 of the pilot's parachute pack. The deployment bag 68 includes a handle 70 on the end thereof opposite an opening through which the folded parachute is inserted into the bag. Rubber bands 72 attached to the bag are placed around the folded shrouds 46 of the parachute in a manner to permit the shrouds to easily pull free. The cables 50 are connected at one end to the shrouds as previously explained and the other end to the cable 52 with a D-clamp 60 at the juncture thereof for connecting to the cable 58 which is attached to the aircraft frame. The cable 58 has an eye in each end with one eye 58a larger than the eye 58b, such that the eye 58b can pass through the eye 58a. The 58a end of the cable is passed around the root tube 16 of the frame and the eye 58b passed through the eye 58a for looping the cable around the root tube and securing it thereto. The cable 52 is connected at one end to cable 50 and at the other end to the harness of the parachute which is worn by the pilot.

The cables are sufficient in length, preferably about 26 feet, to permit the parachute, suspension lines, and deployment bag to go 26 feet from the aircraft to open. This length puts the parachute clear of the aircraft to open and clear after deployment so that the aircraft does not steal air from the open parachute.

Figure 5:
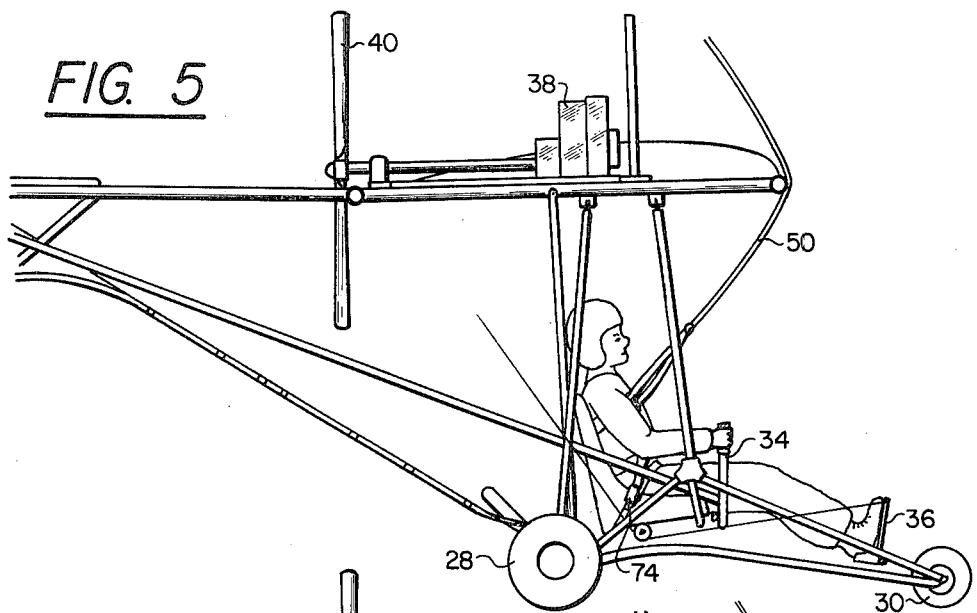
FIG. 5 is a side elevation view showing an alternate embodiment of the invention.
Figure 4:
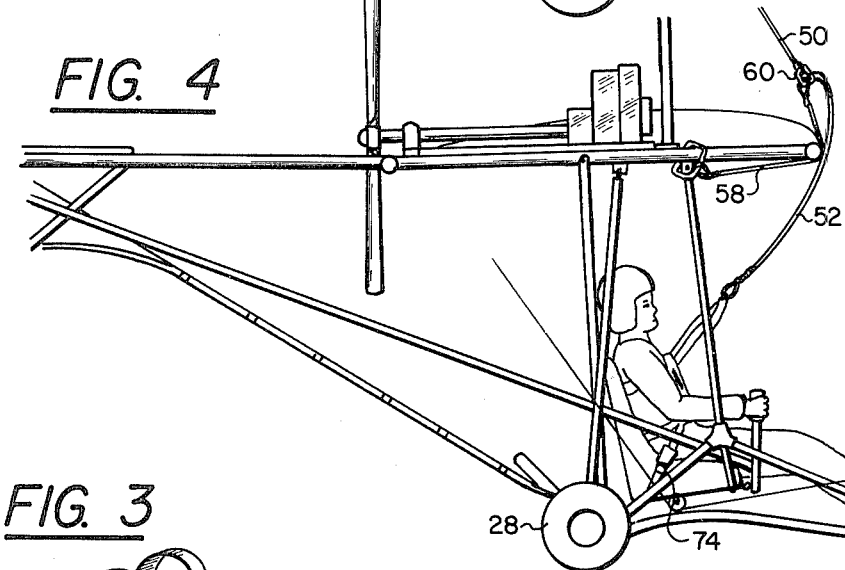
FIG. 4 is a view like FIG. 2 with the parachute deployed.

Turning to FIG. 5, an alternate arrangement of the system is illustrated, as well as certain steps in the deployment thereof. In an alternate setup of the invention, the cable 58 is omitted and the parachute is thereby connected directly to the harness of the pilot with the pilot either strapped in the aircraft with a high strength belt or the harness includes straps releasably attached to the aircraft by releasable buckles 74 at each side of the pilot. Should the pilot encounter an emergency situation, and desire to deploy the parachute, he simply opens his pack 56 by grasping the handle 70 of the deployment bag 68 and pulling it, and then tosses it directly outward, forward of the aircraft, to clear the aircraft. The weight of the parachute pack as it reaches the end of the cable pulls the shroud lines from the folded condition as held by the rubber bands 72 and further pulls the parachute from the bag 68. The parachute spills out into the open air, clear of the aircraft, and is caught in the relatively moving air, opens and moves upward to tighten the cables 50, 52 and assume the load of the aircraft and the pilot. In the arrangement as shown in FIGS. 1, 2 and 4, the parachute is connected to the frame of the aircraft, with the aircraft frame holding the load of the aircraft and pilot.

In the alternate setup, as shown in FIG. 5, the load of the aircraft and pilot is supported through the pilot's harness with the parachute connected to the pilot's harness and the harness connected directly to the aircraft by harness straps and releasable buckles 74. This gives the pilot an option to make a decision after the parachute has been deployed as to whether to abandon the aircraft, if desirable. Such conditions as a fire aboard the aircraft, would render this option desirable.

With this arrangement, an ultralight aircraft can be recovered and brought safely to the ground from altitudes of as low as 100 feet. This is possible because of the lightweight and high glide ratio of the ultralight aircraft resulting in the aircraft moving, under normal conditions, a much greater distance horizontally than vertically. The cable arrangement permits the use of the parachute setup on powered ultralight aircraft. Previous attempts to utilize parachutes on powered ultralight aircraft were unsuccessful because of the failure of the shroud lines and nylon cables normally employed. Such cables frequently became entangled in the aircraft propeller and were cut or broken or came into contact with the hot exhaust or manifold of the aircraft engine resulting in melting of the nylon cables.

The present cable arrangement has satisfactorily solved this problem as well as permitted the pilot the option of saving or abandoning the aircraft. The vinyl coated stainless steel cables of the present arrangement can withstand entanglement with the aircraft propeller and contact with the hot exhaust manifold and pipe of the engine.

While we have illustrated and described our invention by specific embodiments, it is to be understood that numerous changes and modifications may be made therein without departing from the spirit and scope of the invention as defined in the appended claims.

We claim:

1. A parachute system for recovery of an ultralight aircraft and/or pilot, said system comprising:
    a parachute having a canopy with a plurality of shroud lines and a first elongated cable having a length to position the parachute clear of the engine of said aircraft and connected at one end to the ends of the shroud lines and including attachment means on the other end for attachment to an ultralight aircraft;
    a pilot harness to be worn by a pilot and releasably attached to an aircraft and including a chute pack positioned on the chest of the pilot for containing the parachute; and
    said attachment means includes quick release clamp means for selective attachment to said aircraft through said harness and directly to said aircraft for support of an aircraft for controlled substantially vertical descent of said aircraft and pilot.

2. The recovery system of claim 1 wherein:
    said aircraft includes a central root tube extending along the longitudinal axis of the aircraft and said clamp means is attached to the end of a cable attached to said root tube.

3. The recovery system of claim 1 wherein said clamp means is connected to said harness; and
    said harness is attached to said aircraft so that said pilot and said aircraft are supported by said harness.

4. The recovery system of claim 1 in combination with an ultralight aircraft wherein said aircraft is a high wing open frame type having a pilots seat beneath the wings and landing gear extending beneath the pilots seat, said pilot harness is attached adjacent to said pilots seat so that the pilot remains in the pilots seat during descent by the parachute.

5. The recovery system of claim 4 wherein said first elongated cable is connected to the harness; and
- said harness is detachably connected to the frame of the aircraft.

6. The recovery system of claim 5 including a deployment bag in which said chute is packed for placing in said pack and for containing the chute to permit the pilot to throw the chute clear of the aircraft for deployment thereof.

7. The recovery system of claim 4 including a second elongated cable having one end connected to the root tube of the aircraft; and
- the other end including a loop temporarily secured to the aircraft frame adjacent the pilot seat for attachment to said clamp means.

8. The recovery system of claim 5 wherein said first elongated cable is a vinyl coated stainless steel cable having length to position the canopy at least twenty-six feet from the aircraft.

9. The recovery system of claim 8 wherein said canopy is about twenty-eight feet in diameter and constructed of about 1.1 ounce ripstop nylon coated to a 0-3 CFM porosity.

10. A parachute system for selective recovery of an ultralight aircraft and/or pilot, said systems comprising:
- a parachute having a canopy with a plurality of shroud lines and a first elongated cable having a length to position the parachute clear of the engine and propeller of the aircraft and connected at one end to the ends of the shroud lines and including attachment means on the other end for attachment to an ultralight aircraft;
- a pilot harness to be worn by a pilot and releaseably attachable to the frame of an aircraft adjacent the pilot seat and including a chute pack for containing the parachute; and
- said attachment means includes quick release clamp means for selective attachment to said aircraft for support of said aircraft and a pilot therein through said harness and
- said cable attached to the frame of said aircraft.

11. The recovery system of claim 10 in combination with an ultralight aircraft wherein said aircraft is a high wing open frame type having a fixed pilot's seat secured to the aircraft frame beneath the wings, and said aircraft including landing gear extending beneath the pilot's seat;
- said parachute being connected to said aircraft so that descent of said aircraft under control of said parachute takes place with the pilot seated in the pilot's seat.

12. The recovery system of claim 11 wherein:
- said aircraft includes a central root tube extending along the longitudinal axis of the aircraft and said clamp means is attached to the end of a cable attached to said root tube.

13. The recovery system of claim 12 including a deployment bag in which said chute is packed for placing in said pack and for containing the chute to permit the pilot to throw the chute forward and clear of the aircraft for deployment thereof forward of the wing.

* * * * *